United States Patent [19]

Voellmer

[11] Patent Number: 5,178,431
[45] Date of Patent: Jan. 12, 1993

[54] DOUBLE-V BLOCK FINGERS WITH CRUCIFORM RECESS

[75] Inventor: George M. Voellmer, Takoma Park, Md.

[73] Assignee: The United States of America as represented by the Administrator of the National Aeronautics and Space Administration, Washington, D.C.

[21] Appl. No.: 899,145

[22] Filed: Jun. 17, 1992

Related U.S. Application Data

[63] Continuation of Ser. No. 760,634, Sep. 16, 1991, abandoned.

[51] Int. Cl.⁵ ............................................. B25J 15/08
[52] U.S. Cl. .................................. 294/86.4; 294/902; 901/39; 269/270
[58] Field of Search ................. 294/86.4, 902; 901/39; 269/265, 266, 268, 270; 81/424.5, 426, 426.5

[56] References Cited

U.S. PATENT DOCUMENTS

| | | | |
|---|---|---|---|
| D. 294,174 | 2/1988 | Radocy | D24/33 |
| 3,848,753 | 11/1974 | Borg et al. | 214/1 B |
| 4,505,636 | 3/1985 | Sugino et al. | 414/736 |
| 4,530,536 | 7/1985 | Williams | 294/86.4 X |
| 4,565,400 | 1/1986 | Nakashima et al. | 294/86.4 X |
| 4,708,383 | 11/1987 | Deringer | 294/86.4 |
| 4,740,025 | 4/1988 | Nelson | 294/99.1 |
| 4,819,978 | 4/1989 | Scheinmen et al. | 294/119.1 |
| 4,822,091 | 4/1989 | Vermeer et al. | 294/86.4 |
| 4,944,765 | 7/1990 | Keith | 623/65 |

Primary Examiner—Charles A. Marmor
Assistant Examiner—Joseph D. Pape
Attorney, Agent, or Firm—R. Dennis Marchant; Guy M. Miller; Paul S. Clohan

[57] ABSTRACT

In a robot having a gripper including a pair of fingers and a drive motor for driving the fingers toward and away from one another while the fingers remain parallel to each other, the fingers consist of finger pads, which interface with a handle on an object to be grasped, and a shank, which attaches the fingers to the robot gripper. The double-V finger has two orthogonal V-grooves forming in the center of the finger pads a recessed cruciform. The double-V finger is used with a handle on the object to be grasped which is the negative of the finger pads. The handle face consists of v-shaped pads capped with a rectangular cruciform. As the gripper is brought into place near the handle, the finger pads are lined up facing the handle pads. When the finger pad and the handle pad are in proper alignment, the rectangular ridges on the handle fall inside the rectangular grooves on the finger, and the grip is complete.

4 Claims, 3 Drawing Sheets

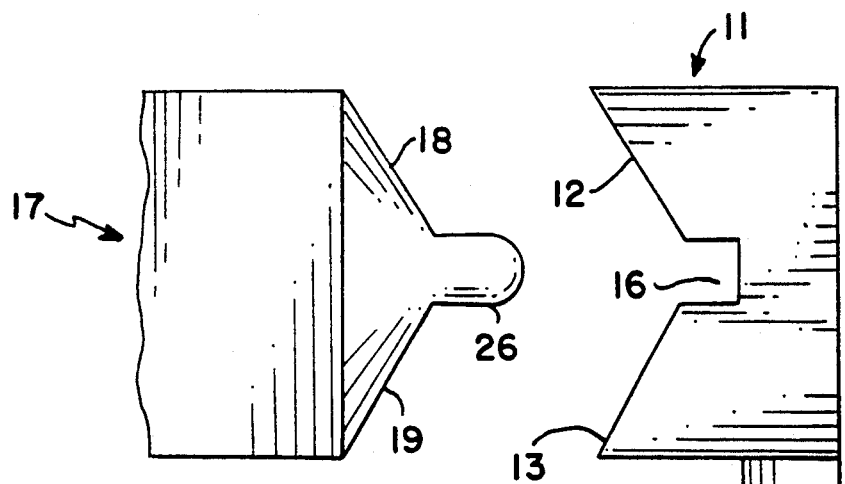
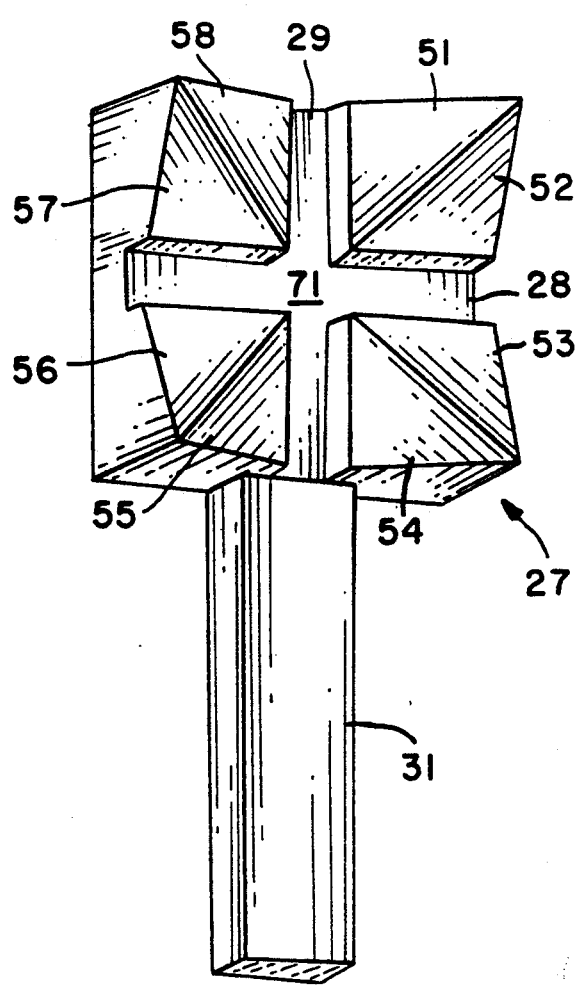
FIG. 3
FIG. 4

DOUBLE-V BLOCK FINGERS WITH CRUCIFORM RECESS

ORIGIN OF THE INVENTION

The invention described herein was made by an employee of the U.S. Government, and may be manufactured and used by or for the Government for governmental purposes without the payment of any royalties thereon or therefor.

This application is a continuation application Ser. No. 07/760,634, filed Sep. 16, 1991, now abandoned.

TECHNICAL FIELD

This invention relates to an object gripping device for robotic applications and more specifically relates to a device to eliminate the backdriving of robotic grippers under twisting or side loads experienced in robotic end effectors.

BACKGROUND ART

Great efforts have been made to make improvements in the design of robotic grippers; however, end effectors, or hands, for robotic arms continue to be a limiting element for efficient use of the robotic grippers. Many different types of grippers have been used in the past, such as general purpose grippers, specialized grippers, wide opening grippers, heavy load grippers, jaw grippers, double grippers, etc. Frequently, robot grippers for outer space use employ finger elements containing "V" grooves to grip an object. These "V" grooves are used to both guide the object into place within the robot finger mechanism and to grasp and lock the object in that position once the object is securely in place. The "V" groove grippers have a frictional component at the interface between the object being grasped and the gripper finger.

In "V" groove grippers, since the parts contact each other with sloped faces, twisting of the object being grasped in the gripper will tend to pry the fingers apart, with large forces. This results in the backdriving of "V" groove grippers; i.e., large moments or forces tend to force the grippers open, requiring the drivetrain to resist this overload, or drop the object.

The apparatus disclosed in the instant invention overcomes the shortcomings of the "V" groove grippers by providing an end effector gripper that will, with very low frictional forces, effectively guide, align and seat an object in a desired position without experiencing backdriving during twisting or side loads.

STATEMENT OF THE INVENTION

It is therefore an object of the present invention to provide a set of fingers for a robot gripper that will improve the gripper's ability to more effectively grasp an object.

It is another object of the present invention to provide a robot gripper that eliminates backdriving during twisting or side loads.

It is still a further object of this invention to provide an improved robot gripper that smoothly and efficiently guides, aligns and securely seats an object in the desired position within the end effector apparatus despite large misalignments.

It is an additional object of this invention to provide an improved robot gripper that will more accurately transmit the magnitude of vector component forces present within the grasped object to force sensors associated with the gripper mechanism.

It is another object of this invention to provide an improved robot gripper that is reliable and durable in operation and that is also easily and inexpensively constructed relative to other robot grippers utilized in outer space applications.

The foregoing objects and others are achieved by providing single- and double-V fingers consisting of a finger pad, which interface with a handle on an object to be moved, and a shank, which attaches the finger to the robot gripper. The finger pads are v-shaped and used to cradle objects to be moved. The single-V finger has one groove, perpendicular to the shank. The double-V finger also has v-shaped pads, and in the center of the finger pads there is a recessed cruciform.

The double-V finger is used with a handle on the object to be moved which is the negative of the finger. The handle face consists of v-shaped pads capped with a protruding rectangular cruciform. As the gripper is brought into place near the handle, the finger pads are lined up facing the handle pads.

Invariably, there will be some misalignment between the finger pads and the handle pads. As the gripper fingers are closed down upon the handle, the protruding rectangular cruciform ridges on the handle will contact the sloped portion of the v-shaped finger pads. This sets up a force vector on the finger pads pushing the finger into a more correct orientation. This force is sensed either by the teleoperator via force feedback, or by a force-torque sensor in an autonomous robot's wrist, allowing corrective realignments of the manipulator to be performed.

When the finger pads and the handle pads are in proper alignment, the protruding rectangular cruciform ridges on the handle will fall inside the recessed rectangular cruciform grooves in the finger, and the grip is complete. The protruding rectangular cruciform ridges on the handle have a loose fit inside the finger recessed rectangular cruciform grooves, so the actual contact between the finger and the handle is made by the sloped faces of the finger pads contacting the sloped faces of the handle pads. This ensures that the mechanical interface between the two parts is highly repeatable; the handle returns to exactly the same orientation with respect to the gripper each time the handle is grasped.

The rectangular ridges of the protruding cruciform on the handle come into play when large forces are to be transmitted across the interface. Since the parts contact each other with sloped faces, twisting of the handles in the fingers would tend to pry the fingers apart with large forces. With the rectangular ridges, small deflections of the finger are allowed before the sides of the rectangular ridge (protruding cruciform) contact the sides of the grooves (recessed cruciform). The sides of the groove are orthogonal to the direction of force, hence there is no component of the force prying the fingers open, only one pushing them sideways. Thus the gripper drivetrain does not need to take these overloads into account.

The single-V finger operates on a similar principle except the capture range is only large in the direction of the finger shank. This simplifies the design of the handle needed on cylinders, such as a truss element. All that is needed is a circumferential, rectangular ridge, with several longitudinal ridges. These will then form raised cruciforms around the perimeter of the cylinder, which fit into the recesses in the finger pad.

BRIEF DESCRIPTION OF THE DRAWINGS

FIG. 3 is a side view of the single-V gripper about to grip an object to be moved.

FIG. 4 is a perspective view of a double-V finger gripper according to the present inventive concepts.

DETAILED DESCRIPTION OF THE INVENTION

Figure 1:
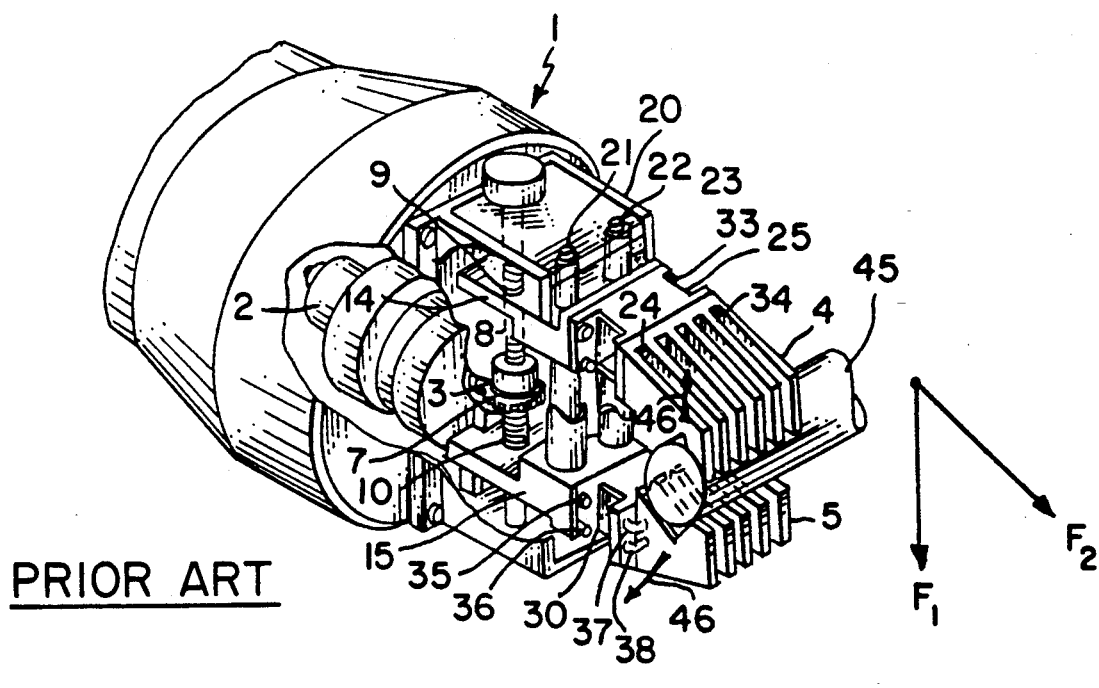
FIG. 1 is a perspective view of prior art "V-groove" grippers.

FIG. 1 depicts a prior art robotic hand assembly 1 including a pair of identical and opposing single-V fingers 4 and 5. Fingers 4 and 5 are adapted to move closer to or further apart from each other in response to any well known gear motor combination. As shown in FIG. 1, motor 2 rotates a beveled drive gear 3. A mating drive gear 7 is mounted on and secured to a threaded shaft 8. Shaft 8, upon rotation, moves fingers 4 and 5 either closer together or further apart depending upon the direction of rotation.

Shaft 8 turns within inner threaded openings 9 and 10 in a pair of guide pieces 14 and 15. Guide pieces 14 and 15 slide in a channel frame 20, which frame holds a pair of double slide rods 21, 22. Fingers 4 and 5 are thus adapted to move together or apart in a smooth non-binding motion under control of any suitable computer or control system (not shown) which energizes motor 2.

On the flat outer faces of guides 14 and 15 are mounted a pair of flexible base members 25 and 30. Each base member is I shaped and has a central elongated hollow rectangular cylinder with extending mounting ears integrally formed therewith. Threaded bolts, such as 23, 24 and 33, 34 holds the upper and lower edges of the outwardly extending ears of base block 25 respectively to guide 14 and finger 4. Comparable bolts 35, 36 and 37, 38 secure finger 5 to guide 15.

In this prior art embodiment, fingers 4 and 5 move parallel to one another. When a force $F_1$ or $F_2$ is applied to cylinder 45, a reactive force shown by arrows 46 will cause fingers 4 and 5 to open and to backdrive the gear train. This condition has proved to be a serious limitation of prior art "V" groove grippers and is overcome by the present invention as discussed below.

Figure 2:
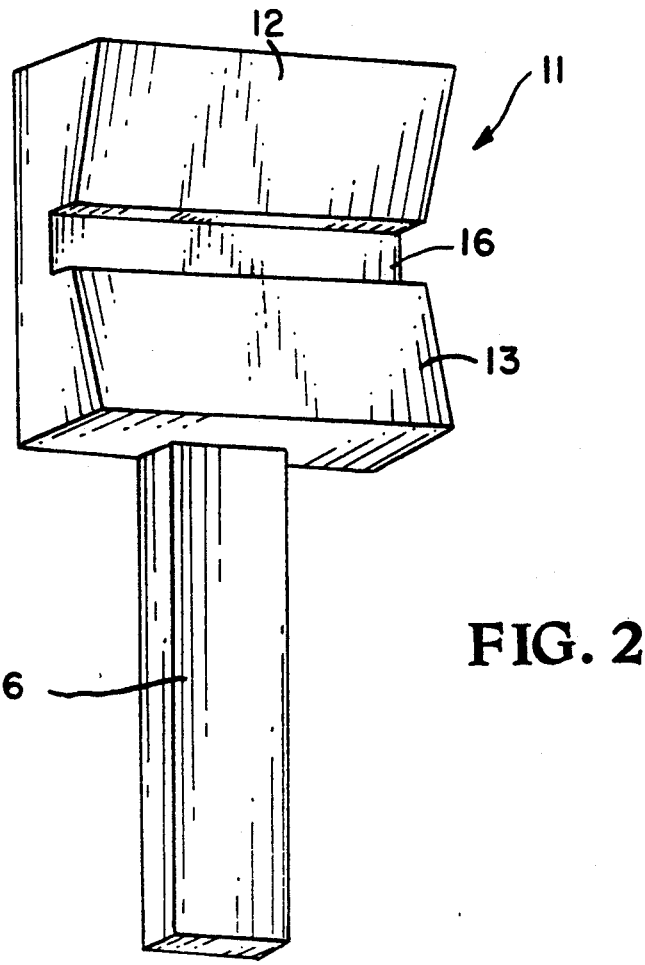
FIG. 2 is a perspective view of a single-V finger gripper according to the present inventive concepts.

A new design single-V finger is shown in FIG. 2, and a new design double-V finger is shown in FIG. 4. Referring first to FIGS. 2 and 3, the new design single-V finger 11 consists of finger pads 12 and 13 which interface with a handle 17 (FIG. 3) on the object to be moved (not shown), and a shank 6, which attaches finger 11 to the robot gripper in a standard manner. Finger pads 12 and 13 comprise a large V-shaped groove, machined into the face of finger 11, to cradle objects to be moved, such as cylinder 45 shown in FIG. 1. Single-V finger 11 also has one recessed groove 16, which is perpendicular to shank 6. Recessed groove 16 mates with ridge 26 on handle 17. In addition, finger pads 12 and 13 mate with handle pads 18 and 19; this is clearly shown in FIG. 3. The double-V finger 27, shown in FIG. 4, has two orthogonal recessed grooves 28 and 29 forming in the center of the finger pads a recessed cruciform 71. The double-V finger also has finger pads, but they are outwardly pointed finger pads formed by pads 51–58; i.e., finger pads 51 and 52 form a first outwardly pointed pad, finger pads 53 and 54 form a second outwardly pointed pad, etc. This combination of outwardly pointed pads thus forms a double-V finger in which the v-shaped pads are orthogonal to one another.

Figure 5:
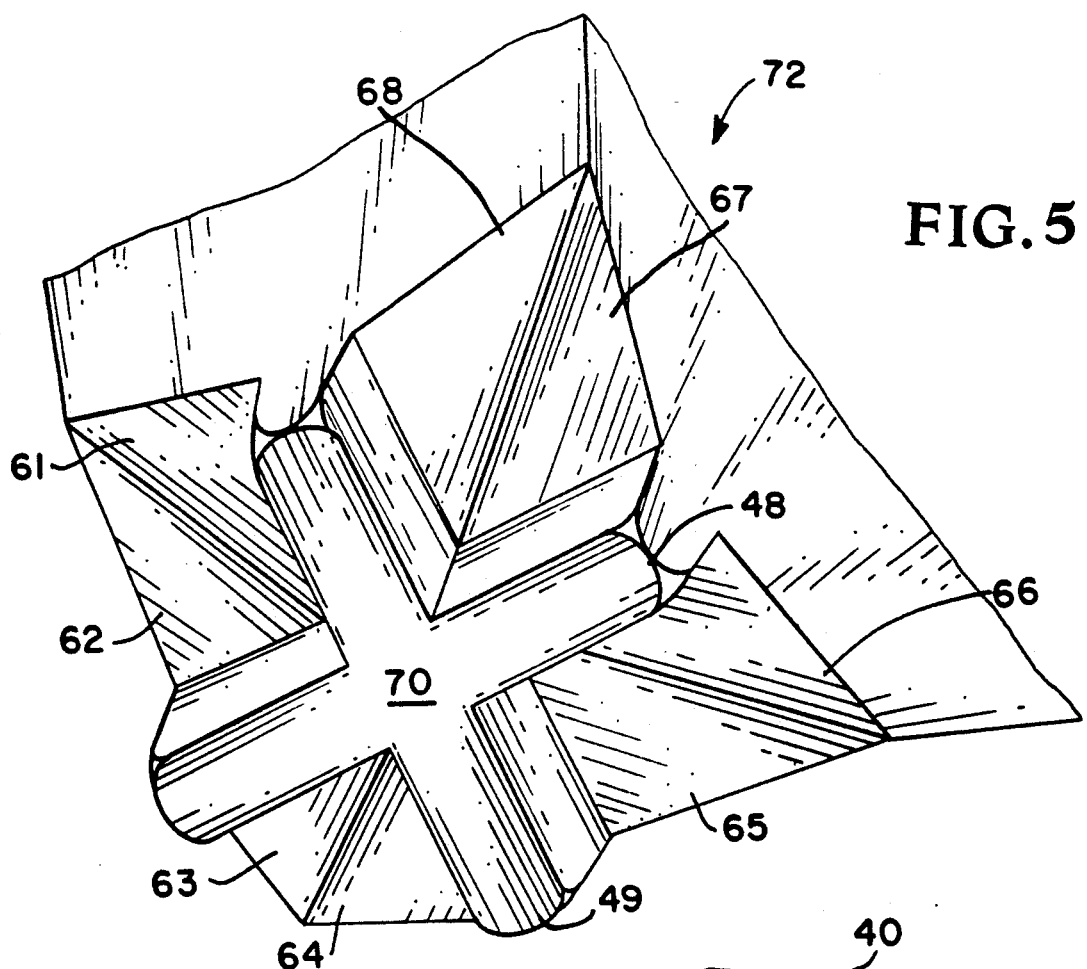
FIG. 5 is a perspective view of the mating interface for the double-V finger gripper.

The double-V finger 27 shown in FIG. 4 is used with a handle which is the negative of the finger, shown in FIG. 5. Handle 72, a pair of which are attached to an object to be moved (not shown), consists of four inwardly sloped handle pads, formed by pads 61–68, capped with a protruding rectangular cruciform 70 consisting of intersecting ridges 48 and 49. Handle pads 61–68 mate with finger pads 51–58 respectively. As a pair of fingers 27 is brought into place near a pair of handles 72, the finger pads 51–58 are lined up facing the handle pads 61–68.

Invariably, there will be some misalignment between the finger pads 51–58 and the handle pads 61–68. As the fingers are closed down upon the handles, the raised rectangular cruciform 70 on handle 72 will contact a sloped portion of the pointed pads on finger 27. This sets up a force vector on the finger pads, pushing finger 27 into a more correct orientation. This force is sensed either by the teleoperator via a force feedback, or by a force-torque sensor in an autonomous robot's wrist, allowing corrective realignments of the manipulator to be performed.

When the finger pads 51–58 and the handle pads 61–68 are in proper alignment, protruding cruciform 70 on handle 72 falls inside recessed cruciform 71 in finger 27, and the grip is complete. Cruciform 70 on handle 72 has a loose fit inside finger cruciform 71, so the actual contact between finger 27 and handle 72 is made by the sloped faces of the finger pads contacting the sloped faces of the handle pads. This ensures that the mechanical interface between the two parts is highly repeatable; the handle returns to exactly the same orientation with respect to the gripper each time the handle is grasped.

The two mating cruciforms 70 and 71 come into play when large forces are to be transmitted across their interface. Since the fingers and handles contact each other with sloped faces, twisting of handle 72 in finger 27 would tend to pry the fingers apart, with relatively large forces. With the two cruciforms 70 and 71 present however, small deflections of the fingers are allowed before the sides of the cruciforms contact each other. The sides of the cruciforms are orthogonal to the directions of force, hence there is no longer a component of the force prying the fingers open, only one pushing them sideways. Thus the gripper drivetrain does not need to take these overloads into account.

Single-V finger 11 (FIG. 3) operates on a similar principle except the capture range is only large in the direction of the finger shank. This simplifies the design of the handle needed on cylinders, such as a truss element. All that is needed is a circumferential, rectangular ridge, with several longitudinal ridges. These will then form raised cruciforms around the perimeter of the cylinder, which fit into the recesses in the finger pad.

Figure 6:
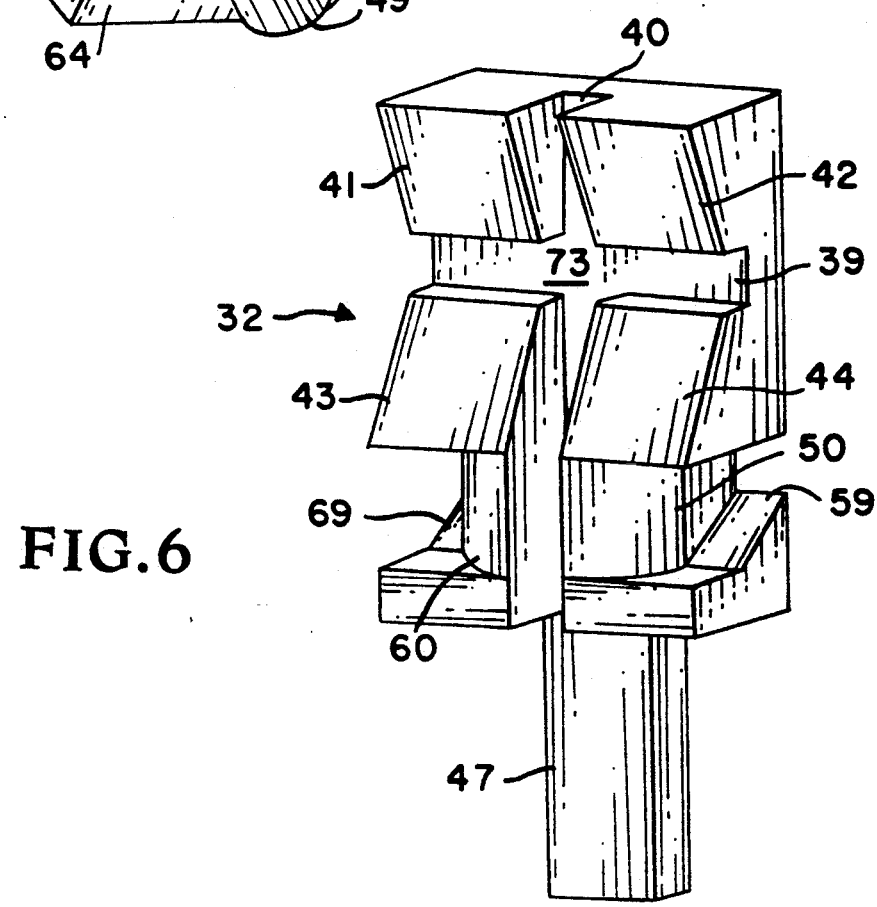
FIG. 6 is a perspective view of an alternate embodiment of the double-V finger gripper.

An H-handle fitting can also be provided and is shown in FIG. 6. A typical H-handle compatible finger 32 consists of pads 41–44, grooves 39 and 40 forming cruciform 73, a shank 47, and two pairs of tangs 50 and 60 on either end. These are particularly useful for work with the NASA Module Servicing Tool. The thickened protions of the finger shanks fit with 0.005" clearance between the tangs which form an end of the handle.

Additionally, the handle is sandwiched between the wider cruciform pad on the top, and a set of tabs on the bottom. Generous chamfers assist in the acquisition of the handle. As the fingers close completely upon the H-handle, inclined surfaces 59 and 69 on the bottom tab wedge the handle against the finger pad above, securely locking the handle in place.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. In a robotic system having a gripper to grip an object to be moved including a pair of fingers and a drive means for driving the fingers toward and away from one another while said fingers remain parallel to each other, each of said fingers comprises:

a lower portion comprising a shank for mounting said finger to said gripper;

an upper portion affixed to said lower portion and having a plurality of finger pads thereon;

said plurality of finger pads comprising pairs of surfaces forming outwardly pointed surface pairs and thereby forming v-shaped finger pads on said upper portion of said finger;

said plurality of finger pads having eight said pairs of surfaces thereby forming four outwardly pointed surface pairs and thereby forming two orthogonal v-shaped finger pads on said upper portion of said finger;

two recessed grooves on said upper portion orthogonal to one another thereby forming a recessed cruciform at the center of said upper portion of said finger; and said object to be moved having a pair of complementary surfaces to mate with said upper portion of said pair of fingers, each said surface comprising a like plurality of surface pads, complementary in shape to said finger pads, to mate with said plurality of finger pads and at least one protruding ridge to mate with said at least one recessed groove on said upper portion of said finger.

2. The robotic system of claim 1 wherein said recessed grooves are rectangular in cross-section.

3. The robotic system of claim 1 further including a pair of tangs located below said upper portion of said fingers.

4. The robotic system of claim 3 in which said tangs include inclined surfaces.

* * * * *